(12) United States Patent
Ishihara

(10) Patent No.: US 12,491,994 B2
(45) Date of Patent: Dec. 9, 2025

(54) CHARGE CONTROL SYSTEM AND CHARGE CONTROL METHOD AND AIRCRAFT

(71) Applicant: HONDA MOTOR CO., LTD., Tokyo (JP)

(72) Inventor: Yuya Ishihara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 18/186,221

(22) Filed: Mar. 20, 2023

(65) Prior Publication Data

US 2023/0303258 A1 Sep. 28, 2023

(30) Foreign Application Priority Data

Mar. 25, 2022 (JP) ................................ 2022-050933

(51) Int. Cl.
*B64C 29/00* (2006.01)
*B60L 58/13* (2019.01)
(Continued)

(52) U.S. Cl.
CPC .......... *B64C 29/0008* (2013.01); *B60L 58/13* (2019.02); *B60L 58/22* (2019.02);
(Continued)

(58) Field of Classification Search
CPC .... B64D 27/24; B64D 27/026; B64D 35/021; B64D 35/02; B60L 58/13; B60L 58/22;
(Continued)

(56) References Cited

U.S. PATENT DOCUMENTS 6,388,649 B1 * 5/2002 Tanaka .................... G02F 1/135
345/97
11,465,734 B1 * 10/2022 Wiegman ............... B64D 31/10
(Continued)

FOREIGN PATENT DOCUMENTS

JP 2005287146 A 10/2005
JP 2014117066 A 6/2014
(Continued)

OTHER PUBLICATIONS

Office Action issued for counterpart Japanese Application No. 2022-050933, transmitted from the Japanese Patent Office on Oct. 7, 2025 (drafted on Sep. 26, 2025).

*Primary Examiner* — Hunter B Lonsberry
*Assistant Examiner* — Jalal C Coduroglu

(57) ABSTRACT

To control charging of a battery without applying an overload by power feed of a generator based on a state of charge of the battery. A charge control system includes an engine and a motor generator for supplying generated power to two motors of a VTOL rotor and a cruising rotor, a plurality of batteries including two batteries for storing the electrical power generated by the generator and supply the stored electrical power to each of the two motors, a switch for connecting or disconnecting each of the batteries to or from the generator, and a control section for controlling the switch based on a state of charge of each of the batteries to disconnect one battery with a larger charge amount out of the two batteries from the generator and connect the other battery with the smaller charge amount out of the two batteries to the generator.

20 Claims, 8 Drawing Sheets

(51) Int. Cl.
   *B60L 58/22*    (2019.01)
   *B64D 27/02*    (2006.01)
   *B64D 35/02*    (2024.01)
   *B64D 35/021*   (2024.01)

(52) U.S. Cl.
   CPC ........... *B64D 35/02* (2013.01); *B64D 35/021* (2024.01); *B60L 2200/10* (2013.01); *B64D 27/026* (2024.01)

(58) Field of Classification Search
   CPC ...... B60L 2200/10; B60L 58/21; B64C 39/12; B64C 29/0008
   See application file for complete search history.

(56) References Cited

U.S. PATENT DOCUMENTS

| | | | | |
|---|---|---|---|---|
| 2001/0009147 | A1* | 7/2001 | Takashima | B60W 10/06 180/65.235 |
| 2011/0127962 | A1* | 6/2011 | Murao | H02J 7/0016 320/118 |
| 2015/0311731 | A1* | 10/2015 | Tatsumoto | H02J 7/007 399/88 |
| 2015/0380956 | A1* | 12/2015 | Kaji | H02J 7/007 320/134 |
| 2016/0153374 | A1* | 6/2016 | Tashiro | F02D 41/0002 701/103 |
| 2017/0282899 | A1* | 10/2017 | Takizawa | B60L 53/22 |
| 2018/0266637 | A1* | 9/2018 | Curlett | H01M 10/6554 |
| 2019/0275900 | A1* | 9/2019 | Niimi | B60L 58/15 |
| 2020/0103950 | A1* | 4/2020 | Halsey | H02J 7/0018 |
| 2021/0188068 | A1 | 6/2021 | Yoshizumi | |
| 2021/0370786 | A1 | 12/2021 | Vinson | |
| 2022/0089051 | A1* | 3/2022 | Makino | B60L 50/66 |
| 2022/0209544 | A1 | 6/2022 | Kim | |
| 2022/0281612 | A1 | 9/2022 | Inaoka | |
| 2022/0289395 | A1* | 9/2022 | Matsumoto | B60L 50/16 |
| 2022/0355944 | A1 | 11/2022 | Biaujaud | |
| 2023/0014461 | A1 | 1/2023 | Nagase | |

FOREIGN PATENT DOCUMENTS

| | | |
|---|---|---|
| JP | 2019077361 A | 5/2019 |
| WO | 2017130080 A1 | 8/2017 |
| WO | 2021039475 A1 | 3/2021 |
| WO | 2021045539 A1 | 3/2021 |
| WO | 2021089948 A1 | 5/2021 |
| WO | 2021131427 A1 | 7/2021 |

* cited by examiner

|  | STATE OF CHARGE |
|---|---|
| BATTERY 32 IN G1 | 80 % |
| BATTERY 32 IN G2 | 70 % |
| BATTERY 32 IN G3 | 30 % |
| BATTERY 32 IN G4 | 20 % |

FIRST THRESHOLD CHARGE AMOUNT 30%

SECOND THRESHOLD CHARGE AMOUNT 10%

FIG.6

|  | STATE OF CHARGE | CONNECTION STATE |
|---|---|---|
| BATTERY 32 IN G1 | 70 % | DISCONNECTION |
| BATTERY 32 IN G2 | 60 % | DISCONNECTION |
| BATTERY 32 IN G3 | 60 % | CONNECTION |
| BATTERY 32 IN G4 | 50 % | CONNECTION |

FIRST THRESHOLD CHARGE AMOUNT  30%

SECOND THRESHOLD CHARGE AMOUNT  10%

*FIG.8*

CHARGE CONTROL SYSTEM AND CHARGE CONTROL METHOD AND AIRCRAFT

CROSS-REFERENCE TO RELATED APPLICATIONS

The contents of the following Japanese patent application(s) are incorporated herein by reference:
NO. 2022-050933 filed in JP on Mar. 25, 2022

BACKGROUND

1. Technical Field

The present invention relates to a charge control system and a charge control method, and an aircraft.

2. Related Art

Up to now, a vertical take-off and landing aircraft (which is referred to as a VTOL aircraft or also simply referred to as an aircraft) has been proposed which is configured to take off and land by going up and down in a vertical direction by a plurality of take-off and landing (VTOL) rotors arranged on left and right of a fuselage, and to fly in a horizontal direction by cruising rotors arranged in a rear section of the fuselage. Such an aircraft charges a battery with electric power generated by an engine, and operates a plurality of rotors by using the electric power stored in the battery to fly. A plurality of rotors are connected to one battery for each group.

Patent Document 1: WO2021/089948

BRIEF DESCRIPTION OF THE DRAWINGS

FIG. 6 illustrates an example of a state of charge of the battery.

FIG. 8 illustrates an example of the state of charge and a connection state of the battery.

DESCRIPTION OF EXEMPLARY EMBODIMENTS

Hereinafter, the present invention will be described by way of embodiments of the invention, but the following embodiments do not limit the invention according to the claims. In addition, not all of the combinations of features described in the embodiments are essential to the solution of the invention.

Figure 1:
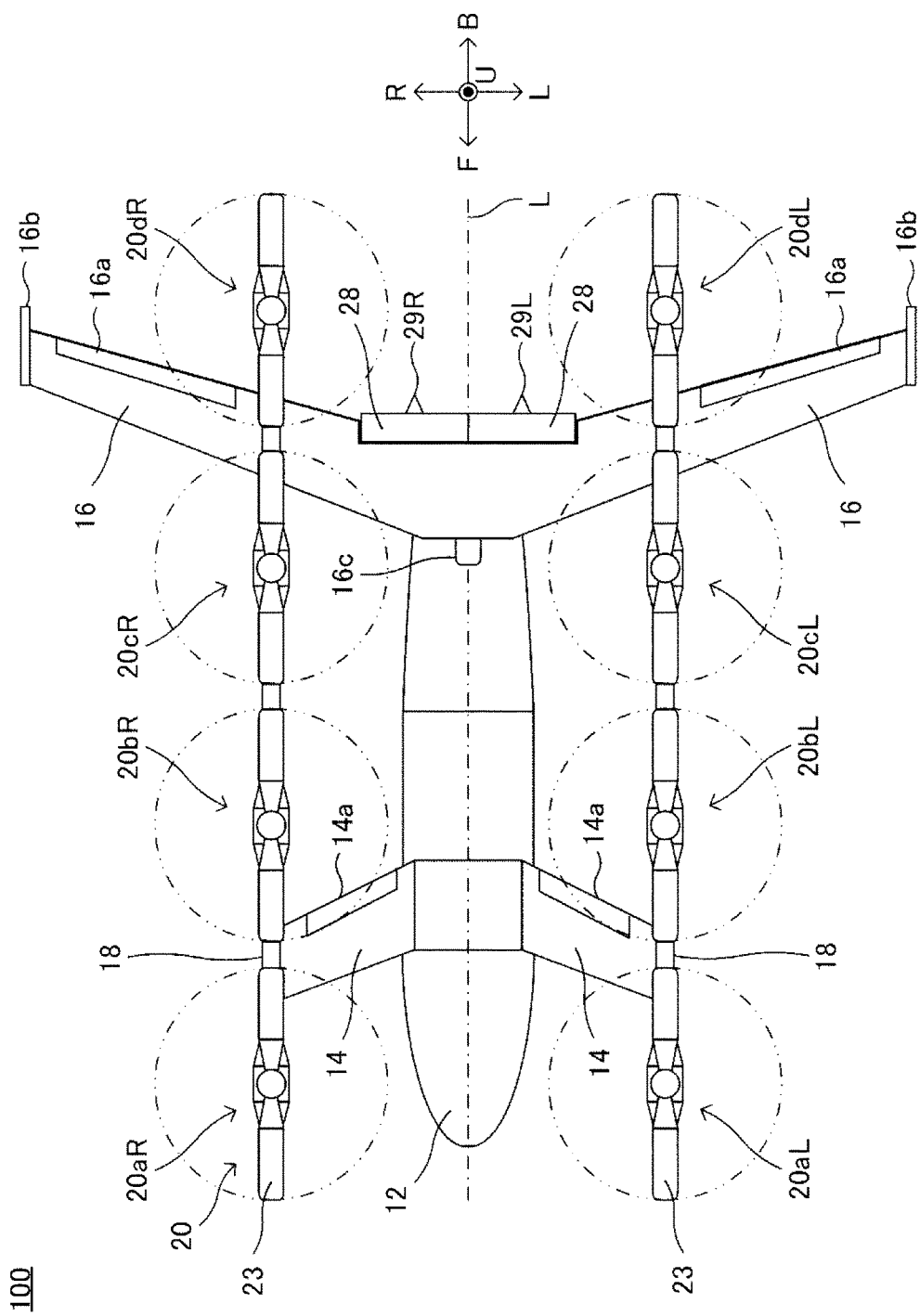
FIG. 1 illustrates a configuration of an aircraft according to the present embodiment in a top view.

FIG. 1 illustrates a configuration of an aircraft 100 according to the present embodiment in a top view. The aircraft 100 is a vertical take-off and landing aircraft which includes a rotor having an electric motor as a drive source and which is configured to take off and land in a vertical direction by generating thrust by using a take-off and landing rotor (also referred to as a VTOL rotor) and to fly in a horizontal direction by generating thrust by using a cruising rotor (also referred to as a cruise rotor), and is also a hybrid aircraft which is configured to operate the electric motor by using electric power generated by an engine 44 and a motor generator 42 (these may also be collectively referred to as a power generator) and electric power stored in a battery 32 and which can also charge the battery 32 by the engine 44. The aircraft 100 according to the present embodiment is configured to charge the battery 32 without applying an overload thereto by power feed from the generator based on a state of charge of the battery 32, and includes a fuselage 12, a front wing 14, a rear wing 16, two booms 18, eight VTOL rotors 20, two cruising rotors 29, an attitude sensor 71, a high voltage system 40, and a communication system 49.

The fuselage 12 is a structure providing a space for an occupant or a passenger to board and for goods or the like to be loaded, and storing apparatuses such as the battery 32, the motor generator 42, and the engine 44. The fuselage 12 is bilaterally symmetric relative to a central axis L, and has a shape that extends in a front-back direction that is parallel to the central axis L and is thin in a left-right direction that is orthogonal to the central axis L in a horizontal plane. Herein, the direction parallel to the central axis L is defined as the front-back direction, in which the left side of the drawing and the right side of the drawing are respectively front (F) and back (B), and the direction orthogonal to the central axis L in the horizontal plane is defined as the width direction (or the left-right direction), in which an upper side of the drawing and a lower side of the drawing are respectively right (R) and left (L). In addition, the vertical direction is orthogonal to each of the front-back direction and the width direction, in which upward and downward in the vertical direction are also respectively referred to as upper (U) and lower (L). The fuselage 12 has a front end with a round curvature in a top view, and a rear end parallel to the width direction which is tapered to some extent relative to a barrel portion.

The front wing 14 is a wing body provided to extend laterally from the fuselage 12, and configured to generate a lift during cruise, that is, by moving forward, which functions as a canard of the aircraft 100. The front wing 14 has a V-shape with two wing bodies respectively extending from a center portion in the front-left direction and the front-right direction, and is fixed on an upper portion of the front side of the barrel portion of the fuselage 12 at the center portion with the opening of the V-shape facing towards the front. The front wing 14 includes elevators 14a arranged in respective rear edges of the two wing bodies.

The rear wing 16 is a wing body provided to extend laterally from the fuselage 12, and configured to generate a lift during cruise, that is, by moving forward, which functions as a swept-back wing configured to reduce air resistance. The rear wing 16 has a V-shape with two wing bodies respectively extending from the center portion in the back-left direction and the back-right direction, and is fixed via a pylon 16c on the upper portion of the rear end of the barrel portion of the fuselage 12 at the center portion with the opening of the V-shape facing towards the back. The rear wing 16 includes elevons 16a arranged respective rear edges of the two wing bodies and vertical stabilizers 16b arranged at wing ends.

Herein, the wing area of the rear wing 16 is greater than that of the front wing 14, and the wing width of the rear wing 16 is wider than that of the front wing. In this manner, the lift generated by the rear wing 16 by moving forward is greater than the lift generated by the front wing 14, and the rear wing 16 functions as the main wing of the aircraft 100. Note that the wing areas, the lengths, or the like of the front wing 14 and the rear wing 16 may be defined based on a balance of the lift generated by each wing, a center of gravity, an attitude of the aircraft body during cruise, and the like.

The two booms 18 are structures laterally spaced from each other from the fuselage 12 and supported by the front wing 14 and the rear wing 16, and function to support or store constituent elements of the VTOL rotors 20. The two booms 18 each have a cylindrical shape extending in the front-back direction in a top view and a wing-shaped cross section with the upper side having a round curvature and the lower side tapered in a front view, and are paired to be arranged bilaterally symmetrically with respect to the fuselage 12 (that is, the central axis L). Note that the two booms 18 may be formed to extend in the front-back direction and have an arch-shape curvature in the width direction. The two booms 18 each have a front end portion located on the forward side relative to the front wing 14 and are supported by the tip of the front wing 14 on a front side of the barrel portion (between the two VTOL rotors 20aL and 20bL on the front side and between the two VTOL rotors 20aR and 20bR on the front side), and also each have a rear end portion located on the back side relative to the rear wing 16 and are supported by the rear wing 16 on a back side of the barrel portion (between the two VTOL rotors 20cL and 20dL on the back side and between the two VTOL rotors 20cR and 20dR on the back side).

The eight VTOL rotors 20 (20aL to 20dL and 20aR to 20dR) are examples of a propulsion system supported by the two booms 18 and configured to generate thrust in the vertical direction to fly during take-off and landing. The four VTOL rotors 20aL to 20dL among the eight VTOL rotors 20 are supported by the boom 18 on the left side at substantially equal intervals, and the remaining four VTOL rotors 20aR to 20dR are supported by the boom 18 on the right side at substantially equal intervals. Herein, with regard to the VTOL rotors 20aL to 20dL on the left side, the VTOL rotor 20aL is arranged at a forwardmost position, the two VTOL rotors 20bL and 20cL are respectively arranged in the front and the back between the front wing 14 and the rear wing 16, and the VTOL rotor 20dL is arranged at a rearmost position. Similarly, with regard to the VTOL rotors 20aR to 20dR on the right side, the VTOL rotor 20aR is arranged at a forwardmost position, the two VTOL rotors 20bR and 20cR are respectively arranged in the front and the back between the front wing 14 and the rear wing 16, and the VTOL rotor 20dR is arranged at a rearmost position. Among these VTOL rotors 20aL to 20dL on the left side and these four VTOL rotors 20aR to 20dR on the right side, the VTOL rotors 20aL and 20aR, the VTOL rotors 20bL and 20bR, the VTOL rotors 20cL and 20cR, and the VTOL rotors 20dL and 20dR, each two being equally positioned on the left side and right side with respect to the front-back direction, respectively form pairs, and are controlled to rotate in mutually opposite directions.

Note that unless otherwise stated, each of the eight VTOL rotors 20aL to 20dL and 20aR to 20dR is simply referred to as a VTOL rotor 20.

Figure 2:
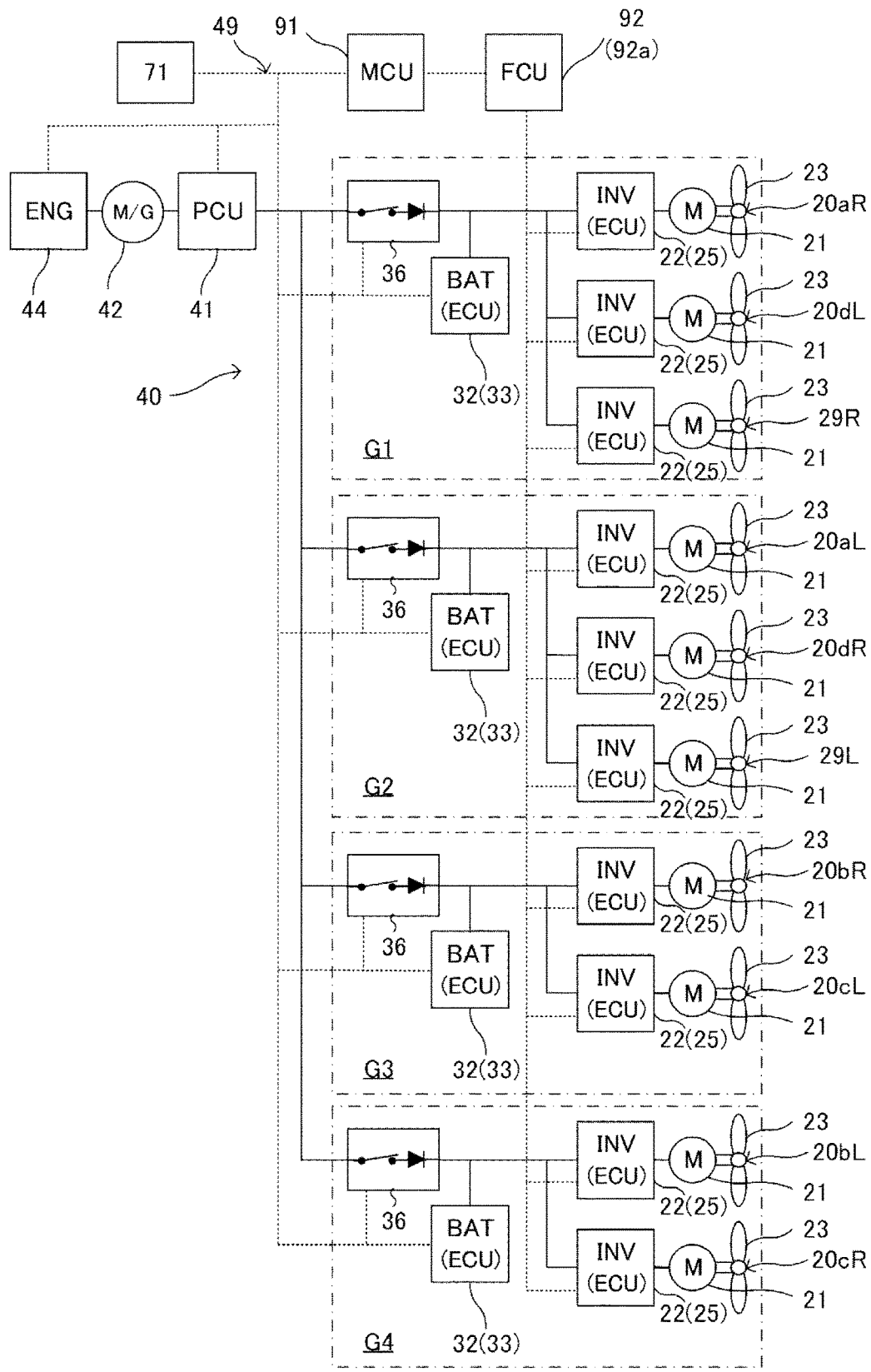
FIG. 2 illustrates a configuration of a high voltage system and a configuration of a communication system.

The VTOL rotor 20 has one or more blades 23, a motor 21, an inverter 22, and an ECU 25 (see FIG. 2).

The one or more blades 23 are blade-like members supported on the boom 18 and configured to generate thrust in the vertical direction by rotating. In the present embodiment, the number of blades 23 is set as two, but may be one or any number including three or more. The one or more blades 23 are supported at a position higher than the front wing 14 and the rear wing 16. Note that in FIG. 1, the plane of rotation of the one or more blades 23 of each VTOL rotor 20 is illustrated by using two-dotted lines.

The motor 21 is an electric motor which has a rotary shaft (not illustrated) towards in the up-and-down direction and which is configured to rotate the blade 23 fixed to the motor 21 via a transmission (not illustrated) configured to convert a rate of rotation of the rotary shaft. The motor 21 is housed in the boom 18.

The inverter 22 is an apparatus configured to receive the supply of DC power via the high voltage system 40 from the battery 32 and convert the DC power into AC power to be supplied to the motor 21 by driving (turning on and off) a switching element according to a drive signal received from the ECU 25. The inverter 22 is housed in the boom 18 together with the motor 21. The inverter 22 can control the rotational torque and the rate of rotation of the motor 21 by increasing and decreasing amplitude and a frequency of the AC power, respectively.

The electronic control unit (ECU) 25 is a unit configured to control, by transmitting the drive signal to the inverter 22, the operation of the inverter to modulate the amplitude and the frequency of the AC power. In the present embodiment, the ECU 25 is built in the inverter 22. As an example, the ECU 25 is implemented by a micro controller, operates by receiving DC power at a low voltage via a low voltage system (also referred to as LVS) from the battery 32, and exhibits a control function by performing a dedicated program stored in a memory.

The two cruising rotors 29 (29L and 29R) are propulsion systems supported by the rear end of the fuselage 12 and configured to generate thrust during cruise (see FIG. 2). The cruising rotors 29L and 29R are arranged side by side on the left and right relative to the central axis L in a cylindrical duct 28 fixed to the rear end of the fuselage 12, and have one or more blades 23 supported in the duct 28 and configured to generate thrust to move forward by rotating, the motor 21 having the rotary shaft towards the front-back direction and rotating the one or more blades 23 fixed to the tip via the rotary shaft, the inverter 22 configured to receive DC power supply from the battery 32 and convert the DC power into AC power to be supplied to the motor 21, and the ECU 25 configured to control the operation of the inverter 22. The inverter 22 can control the rate of rotation of the motor 21. These constituent elements are constituted similarly to those in the VTOL rotor 20.

Note that unless otherwise stated, each of the two cruising rotors 29L and 29R will be simply referred to as the cruising rotor 29. In addition, unless otherwise stated, the VTOL rotors 20 and the cruising rotors 29 will be collectively referred to as rotors 20 and 29.

The attitude sensor 71 is an example of an attitude detection unit, and is a sensor or a sensor group which is configured to detect an attitude of the aircraft 100. The attitude sensor 71 is fixed inside the fuselage 12, and detects an inclination thereof, that is, rolling and pitching as an attitude of the aircraft 100. As the attitude sensor 71, for example, the inclination can be detected from a detection result such as an angular speed or an acceleration by an angular speed (gyro) sensor or an acceleration sensor. The detection result is transmitted to the control section 91 via the communications line.

FIG. 2 illustrates a configuration of the high voltage system (also referred to as a power distribution system (PDS)) 40 and a configuration of the communication system 49.

The high voltage system 40 is constituted to include the engine (ENG) 44, the motor generator (M/G) 42, a power control unit (PCU) 41, and four group components G1 to G4. Note that these are connected via a power line (power cable represented by a solid line).

The engine 44 is an internal combustion engine such as a reciprocating engine and a gas turbine engine. The engine 44 is configured to generate rotational power to be output to the motor generator 42.

The motor generator 42 is an electric motor generator serving as a starter when the engine 44 is to be started and also as a generator after the start of the engine 44. Note that the motor generator 42 together with the engine 44 is collectively referred to as a generator. A rotary shaft of the motor generator 42 is coupled to an output shaft of the engine 44. The motor generator 42 is configured to receive motive power of the engine 44 to perform power generation, that is, generate AC power (in particular, three-phase AC power) to be output to a PCU 41, and then supply the generated power via the PCU 41 to the load (that is, the VTOL rotors 20 and the cruising rotor 29 for generating thrust to fly). In addition, at the time of the start of the engine 44, the motor generator 42 receives AC power to generate rotational power to be output to the engine 44.

The PCU 41 is a power conversion unit configured to convert AC power (in particular, three-phase AC power) input from a primary side by using an inverter circuit into DC power to be output to a secondary side, and also to convert DC power input from the secondary side into AC power (in particular, three-phase AC power) to be output to the primary side. A primary side terminal of the PCU 41 is connected to the motor generator 42, and a secondary side terminal is connected to each of the four group components G1 to G4. The PCU 41 can convert AC power output from the motor generator 42 into DC power to be output towards each of the four group components G1 to G4, and also convert DC power supplied from the batteries 32 included in the four group components G1 to G4 into AC power to be output to the motor generator 42.

Each of the four group components G1 to G4 is an electric component group assembled to include any two of the eight VTOL rotors 20, further any one of the two cruising rotors 29 for the group components G1 and G2, the battery 32 attached to these, and a switch 36. Note that these components including the battery 32 are connected via the power line (power cable represented by the solid line) and a circuit element such as a conductor or a diode.

The group component G1 includes the VTOL rotors 20aR and 20dL, the cruising rotor 29R, the battery 32, and the switch 36.

As described above, each of the VTOL rotors 20aR and 20dL and the cruising rotor 29R includes the motor 21 configured to rotate one or more blades 23, and the inverter 22 configured to receive the DC power supply from the battery 32 and convert the DC power into AC power to be supplied to the motor 21. These three rotors 20 and 29 are connected to the battery 32 in parallel.

The battery 32 is an internal power source configured to accumulate electric power to start the engine 44 and also to fly. The battery 32 accumulates the electric power generated from the engine 44 and the motor generator 42 and also supplies the accumulated electric power to the motor 21 via the inverter 22. Herein, a state of charge (in particular, a remaining charge amount or a charge rate) of the battery is also referred to as an SOC. The battery 32 is connected between the three rotors 20 and 29 described above and the switch 36. The battery 32 is managed by an ECU 33 built therein.

The ECU 33 is a unit configured to manage the state of charge of the battery 32. As an example, the ECU 33 is implemented by a micro controller, operates by receiving DC power at a low voltage via the low voltage system from the battery 32, and exhibits a control function by performing a dedicated program stored in the memory. Herein, a state of the battery 32 includes at least a state of charge (a remaining charge amount which is also referred to as the SOC). The ECU 33 is configured to detect the state of charge of the battery 32 by any method, for example, by detecting currents output from the battery 32 to calculate an integration value thereof or detecting a potential at an output end. A result of the detection is transmitted to the control section 91 via a communications line.

The switch 36 is an element configured to connect and disconnect the group component G1 to and from the secondary side terminal of the PCU 41, and as an example, is constituted to include a rectifying element (diode) and a switching element which are connected in series. The rectifying element is an element through which only electric power heading into the group component G1 from the PCU 41 passes. The switching element is an element configured to short-circuit the PCU 41 and the group component G1, and for example, an element such as an insulated gate bipolar transistor (IGBT) can be used as the switching element.

By turning on the switch 36 (switching element), DC power output from the PCU 41 can be transmitted to the battery 32 and the three rotors 20 and 29 via the rectifying element, and by turning off the switch 36, the PCU 41 is cut off from the group component G1 (the battery 32), and only the electric power stored in the battery 32 can be supplied to the three rotors 20 and 29. Note that another switching element connected in parallel to the rectifying element and configured to short-circuit both ends may be included. By turning on the two switching elements, the battery 32 can be directly connected to the PCU 41 without an intermediation of the rectifying element, and by supplying DC power to the PCU 41 from the battery 32, the motor generator 42 can be operated to start the engine 44.

Note that since the switch 36 includes the rectifying element, during the operation of the VTOL rotors 20 and the cruising rotor 29, the supply of electric power from the battery 32 in a certain group component among the four group components G1 to G4 to the other group components can be prevented.

The group component G2 includes the VTOL rotors 20aL and 20dR, the cruising rotor 29L, the battery 32, and the switch 36. These constituent elements are constituted similarly to those in the group component G1.

The group component G3 includes the VTOL rotors 20bR and 20cL, the battery 32, and the switch 36. These constituent elements are constituted similarly to those in the group component G1.

The group component G4 includes the VTOL rotors 20bL and 20cR, the battery 32, and the switch 36. These constituent elements are constituted similarly to those in the group component G1.

Note that in the aircraft 100 according to the present embodiment, the single battery 32 is included in each of the four group components G1 to G4, and the four batteries are included in total. However the configuration is not limited to this, and any number of batteries 32 may be included. For example, the single battery 32 is included in two of the four group components G1 to G4, and the two batteries 32 are included in total, or two each of the batteries 32 are included in each of the group components G1 to G4, and the eight batteries 32 are included in total. The number of group components is not limited to three rotors each to be assembled into a component, and a component may be assembled with two rotors each or four rotors each. On that basis, one or more batteries 32 may be included in each group component.

The communication system 49 includes the flight controller (FCU) 92, the control section (MCU) 91, the attitude sensor 71, the four switches 36 included in the group components G1 to G4, the four ECUs 33 each of which is connected to the battery 32, and the ten ECUs 25 each of which is connected to the inverter 22. These are connected via a communications line (communication cable represented by a dotted line) so as to be mutually communicable.

The flight controller 92 is a unit configured to receive an operation signal from an occupant of the aircraft 100 via an interface 92a such as a control stick or a thrust lever to control operations of constituent elements. The flight controller 92 is connected to each of the control section 91 and the ten ECUs 25 via the communications line. As an example, the flight controller 92 is implemented by a micro controller, operates by receiving DC power at a low voltage via the low voltage system from the battery 32, and exhibits a control function by performing a dedicated program stored in the memory.

For example, when a command related to steering of the aircraft 100, a command of take-off or cruise, or the like is received via the interface 92a, the flight controller 92 is configured to calculate an individually required thrust (also referred to as a thrust command value) for the VTOL rotor 20 and the cruising rotor 29 and an amount of power required to generate the individually required thrust to be transmitted to the motor generator 42, the PCU 41, and ECU 33 via the control section 91, so that the electrical power required to operate the rotors 20 and 29 is generated. Together with this, the flight controller 92 is configured to cause the switching element of the inverter 22 to operate by transmitting the thrust command value (or the rate of rotation of the rotors 20 and 29 required to generate the thrust) to the ECU 25, and convert DC power output from the PCU 41 or DC power supplied from the battery 32 into AC power to be output to the motor 21. As a result, the motor 21 is activated, and the blade 23 rotates, so that the commanded thrust for the VTOL rotors 20 and the cruising rotor 29 can be generated.

The control section (MCU) 91 is a unit configured to control the control units (that is, the ECUs) included in the communication system 49 in an overall manner, and for example, communicates with the switch 36 to control the operation of the switching element, communicates with the engine 44 to control the start, and communicates with the PCU 41 to control the operation of the switching element, and also communicates with the ECU 33 to detect the state of the battery 32 (in particular, the state of charge). The control section 91 is connected to each of the engine 44, the PCU 41, the four switches 36, and the four ECUs 33 via the communications line. As an example, the control section 91 is implemented by a micro controller, operates by receiving DC power at a low voltage via the low voltage system from the battery 32, and exhibits a control function by performing a dedicated program stored in the memory.

The attitude sensor 71, the four switches 36, the four ECUs 33, and the ten ECUs 25 are constituted as described above.

Figure 3:
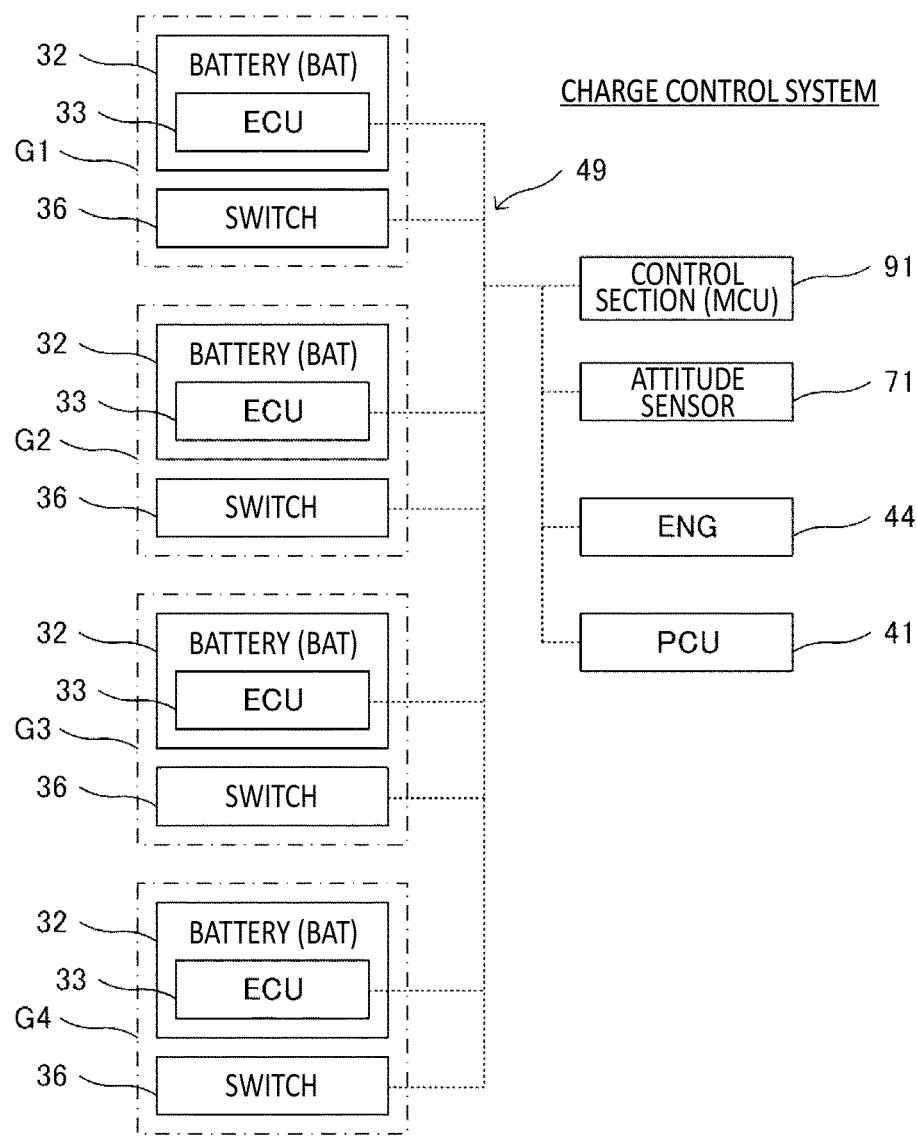
FIG. 3 illustrates a functional configuration of a charge control system according to the present embodiment.

FIG. 3 illustrates a functional configuration of a charge control system 70. The charge control system 70 is a system configured to control charging of the battery 32, and includes the four batteries 32 and the four switches 36 which are included in the group components G1 to G4 described above, the attitude sensor 71, the engine 44, the PCU 41, and the control section 91. Note that the charge control system 70 constitutes a part of the communication system 49. These constituent elements are connected so as to be mutually communicable via a communications line (communication cable represented by a dotted line).

Figure 4:
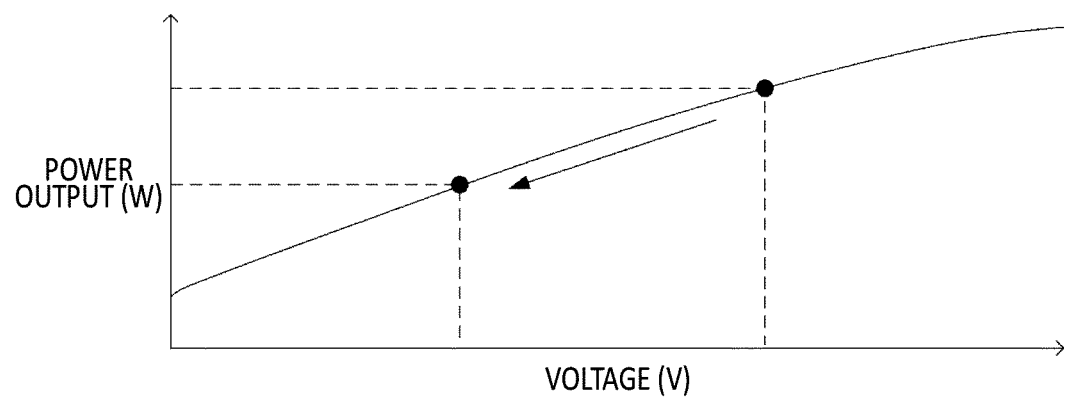
FIG. 4 illustrates a relationship (PV curve) between output power (receiving end power) and a voltage (receiving end voltage) of an engine and a motor generator.

FIG. 4 illustrates a relationship, which is a so-called PV curve, between output power (receiving end power) and a voltage (receiving end voltage) of the engine 44 and the motor generator 42 (generator). The motor generator 42 has such a characteristic that as the output power increases, the receiving end voltage increases. In view of the above, in the charge control system 70 constituted as described above, by turning on the switch 36 to connect the PCU 41 to each of the group components G1 to G4, the control section 91 is configured to output the electrical power generated by the generator to the battery 32 and the inverter 22. Thus, the battery 32 is charged by the power feed from the generator, and also the rotors 20 and 29 are operated.

Herein, when the state of charge of the battery 32 is low, as illustrated in the drawing by using an arrow, the control section 91 controls the generator to decrease the power output to decrease the receiving end voltage to a voltage matching with a charge amount (or an inter-terminal voltage) of the battery 32 or a voltage slightly higher than the matching voltage. Thus, since the receiving end voltage of the generator substantially matches with the charge amount (inter-terminal voltage) of the battery, an amount of current flowing into the battery 32 can be suppressed, and application of an overload to a circuit element such as a cable, a conductor, or a diode through which the current flows can be prevented.

Note that since the inter-terminal voltage increases as the charging of the battery 32 progresses, the control section 91 advances the charging of the battery 32 by gradually increasing the power output of the generator according to the charge amount of the battery 32.

In a case where the battery 32 is sufficiently charged or the like, the control section 91 turns off the switch 36 to cut off the group components G1 to G4 from the PCU 41. Thus, only the electrical power stored in the battery 32 is supplied to the inverter 22 to operate the rotors 20 and 29. At this time, the battery 32 is configured to discharge to decrease the charge amount.

Figure 5:
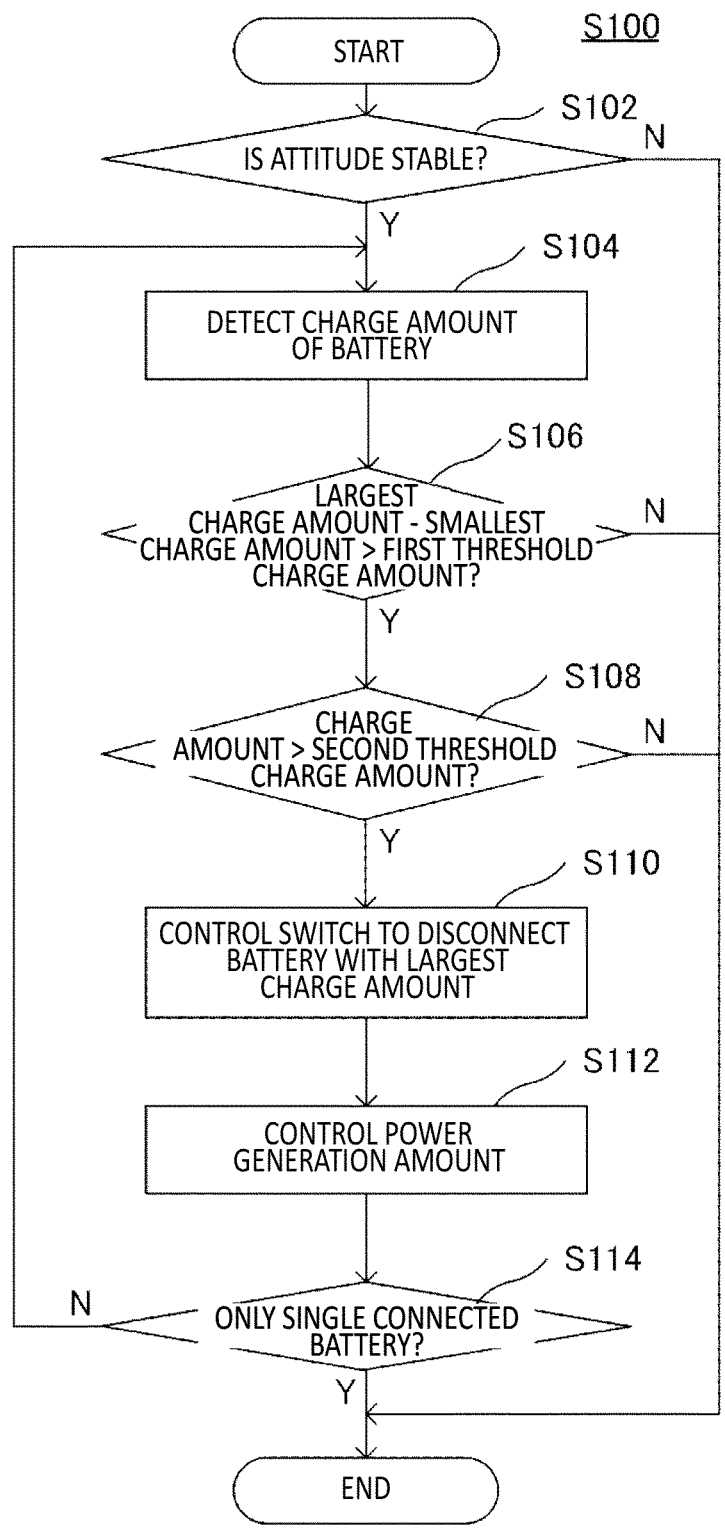
FIG. 5 illustrates a disconnection flow of the battery in a charge control method according to the present embodiment.

FIG. 5 illustrates a battery disconnection flow S100 in a charge control method of controlling the charging of the battery 32 according to the present embodiment.

In step S102, the control section 91 determines whether an attitude of the aircraft 100 (aircraft body) is stable. The attitude of the aircraft body is detected by the attitude sensor 71, and a result of the detection is transmitted to the control section 91. The attitude of the aircraft body can be determined as stable when each of rolling and pitching is within a certain angle with respect to a horizontal state. When it is determined that the attitude of the aircraft body is stable based on the detection result of the attitude sensor 71, the control section 91 proceeds to step S104 to advance the flow. When it is determined that the attitude of the aircraft body is not stable, it is assumed that electrical power is particularly required to allow the rotors 20 and 29 to generate thrust in order to stabilize the attitude of the aircraft body, and the flow is ended such that all the batteries can be charged.

In step S104, the control section 91 detects a state of charge of each of the four batteries 32. The state of charge of each of the four batteries 32 is detected by each of the four ECUs 33, and a result of the detection is transmitted to the control section 91. The control section 91 extracts two batteries 32 with a most charge amount and a least charge amount among the four the batteries 32 based on the detection results received from the four ECUs 33.

For example, in the example of the states of charge of the four batteries 32 illustrated in FIG. 6, the two batteries 32 of the group components G1 and G4 with the most charge amount and the least charge amount are extracted. Note that in the present example, the state of charge (that is, the remaining charge amount) of the battery 32 is represented by a percentage to a largest charge amount, and also for simplicity, all the capacities of the four batteries 32 (that is, the largest charge amounts) are assumed to be the same.

In step S106, the control section 91 determines whether a difference between the charge amount of each of the two batteries 32 extracted in step S104, that is, a difference between the largest charge amount and the smallest charge amount of the four batteries 32, is larger a first threshold charge amount. When the difference is larger the first threshold charge amount, it is assumed that a dominant charge amount difference exists among the batteries, and the flow proceeds to step S108. When the difference is the first threshold charge amount or less, it is assumed that the dominant charge amount difference does not exist among the batteries, and the flow is ended.

In a case of the example of FIG. 6, since a difference at 60% between the charge amounts of the two batteries 32 of the group components G1 and G4 is larger than the first threshold charge amount (30% as an example), the flow proceeds to step S108. Note that the first threshold charge amount can be appropriately set. The control section 91 may retain a predetermined value, or an occupant may input the first threshold charge amount via an interface 92a.

In step S108, the control section 91 determines whether each of the charge amounts of the two batteries 32 extracted in step S104 is larger than a second threshold charge amount. Note that the determination may be performed with regard to the charge amounts of all the four batteries 32 or the batteries 32 of the group components G1 to G4 which are connected to the PCU 41. When each of the charge amounts is larger than the second threshold charge amount, the flow proceeds to step S108. When each of the charge amounts is smaller than the second threshold charge amount, it is assumed that the charge amount of each of the batteries 32 is dominantly decreased to end the flow, and each of the batteries 32 is to be charged.

In a case of the example of FIG. 6, since the charge amounts at 80% and 20% of the respective two batteries 32 of the group components G1 and G4 are larger than the second threshold charge amount (10% as an example), the flow proceeds to step S110. Note that the second threshold charge amount can be appropriately set. The control section 91 may retain a predetermined value, or the occupant may input the second threshold charge amount via the interface 92a.

In step S110, the control section 91 controls the switch 36 to disconnect the battery 32 with the largest charge amount out of the two batteries 32 extracted in step S104 (in the present example, the battery 32 of the group component G1) from the PCU 41 (that is, the generator). Note that when the battery 32 with the smallest charge amount is disconnected from the PCU 41 (that is, the generator), the control section 91 may control the switch 36 to connect the battery 32 to the generator.

In step S112, the control section 91 adjusts the power generation amount by the generator according to the states of charge of the remaining batteries 32 except for the battery 32 disconnected in step S110, that is, the batteries 32 connected to the PCU 41.

In the present example, with respect to the charge amount at 70% of the battery 32 of the group component G2 with the most charge amount among the charge amounts of the batteries 32 of the group components G2 to G4 which are connected to the PCU 41, as described with reference to FIG. 4, the control section 91 controls the engine 44 and the motor generator 42 to decrease the power output, and decreases the receiving end voltage to a voltage matching with the charge amount (or the inter-terminal voltage) of the battery 32 or a voltage slightly higher than the matching voltage. Thus, since the receiving end voltage of the generator substantially matches with the charge amount (inter-terminal voltage) of the battery 32 of the group component G2, and also the difference between the receiving end voltage of the generator and the charge amounts (inter-terminal voltages) of the batteries 32 of the group components G3 and G4 is decreased, as compared with a moment before the battery 32 of the group component G1 is disconnected, the amounts of currents flowing into those batteries 32 can be suppressed, and the application of the overload to the circuit element such as the cable, the conductor, or the diode through which the current flows can be prevented.

In step S114, the control section 91 determines whether only the single battery 32 is connected to the PCU 41. The number of batteries 32 connected to the PCU 41 can be detected from the number of switches which are turned on among the four switches 36. When the number of batteries 32 connected is one, the control section 91 ends the flow. When the number of batteries 32 connected is not one, the flow returns to step S104, and the flow repeats steps S104 to S112 until the difference of the charge amounts between the batteries 32 becomes small (to be the first threshold charge amount or less) and the determination in step S106 becomes negative, until the charge amount of each of the batteries 32 becomes small (to be the second threshold charge amount or less) and the determination in step S108 becomes negative, or until the number of batteries 32 connected to the PCU 41 becomes one, and the determination in step S114 becomes positive.

In the present example, since the batteries 32 of the three group components G2 to G4 are connected to the PCU 41, the flow returns to step S104.

In step S104, the control section 91 detects a state of charge of each of the four batteries 32, and extracts the two batteries 32 of the group components G2 and G4 with the most and least charge amounts among the batteries 32 of the remaining three group components G2 to G4.

In step S106, the control section 91 determines whether the difference of the charge amounts between the two batteries 32 of the group components G2 and G4 is larger than the first threshold charge amount, and since the difference (50%) is larger than the first threshold charge amount (30%), the flow proceeds to step S108.

In step S108, the control section 91 determines whether the charge amount of each of the two batteries 32 of the group components G2 and G4 is larger than the second threshold charge amount, and since each of the charge amounts (70% and 20%) is larger than the second threshold charge amount (10%), the flow proceeds to step S110.

In step S110, the control section 91 controls the switch 36 to disconnect the battery 32 of the group component G2 from the PCU 41 (that is, the generator).

In step S112, the control section 91 adjusts the power generation amount by the generator according to the states of charge of the batteries 32 of the group components G3 and G4 which are connected to the PCU 41.

In the present example, with respect to the charge amount at 30% of the battery 32 of the group component G3 with the most charge amount out of the charge amounts of the batteries 32 of the group components G3 and G4 which are connected to the PCU 41, as described with reference to FIG. 4, the control section 91 controls the engine 44 and the motor generator 42 to further decrease the power output, and decreases the receiving end voltage to the voltage matching with the charge amount (or the inter-terminal voltage) of the battery 32 or the voltage slightly higher than the matching voltage. Thus, since the receiving end voltage of the generator substantially matches with the charge amount (inter-terminal voltage) of the battery 32 of the group component G3, and also the difference between the receiving end voltage of the generator and the charge amount (inter-terminal voltage) of the battery 32 of the group component G4 is decreased, as compared with a moment before the battery 32 of the group component G2 is disconnected, the amounts of currents flowing into those batteries 32 can be suppressed, and the application of the overload to the circuit element such as the cable, the conductor, or the diode through which the current flows can be further prevented.

In step S114, the control section 91 determines whether only the single battery 32 is connected to the PCU 41, and since the two batteries 32 of the group components G3 and G4 are connected, the flow returns to step S104. However, in step S106, since the difference (10%) of the charge amounts of the two batteries 32 of the group components G3 and G4 is smaller than the first threshold charge amount (30%), the determination becomes negative, and the flow is ended.

Figure 7:
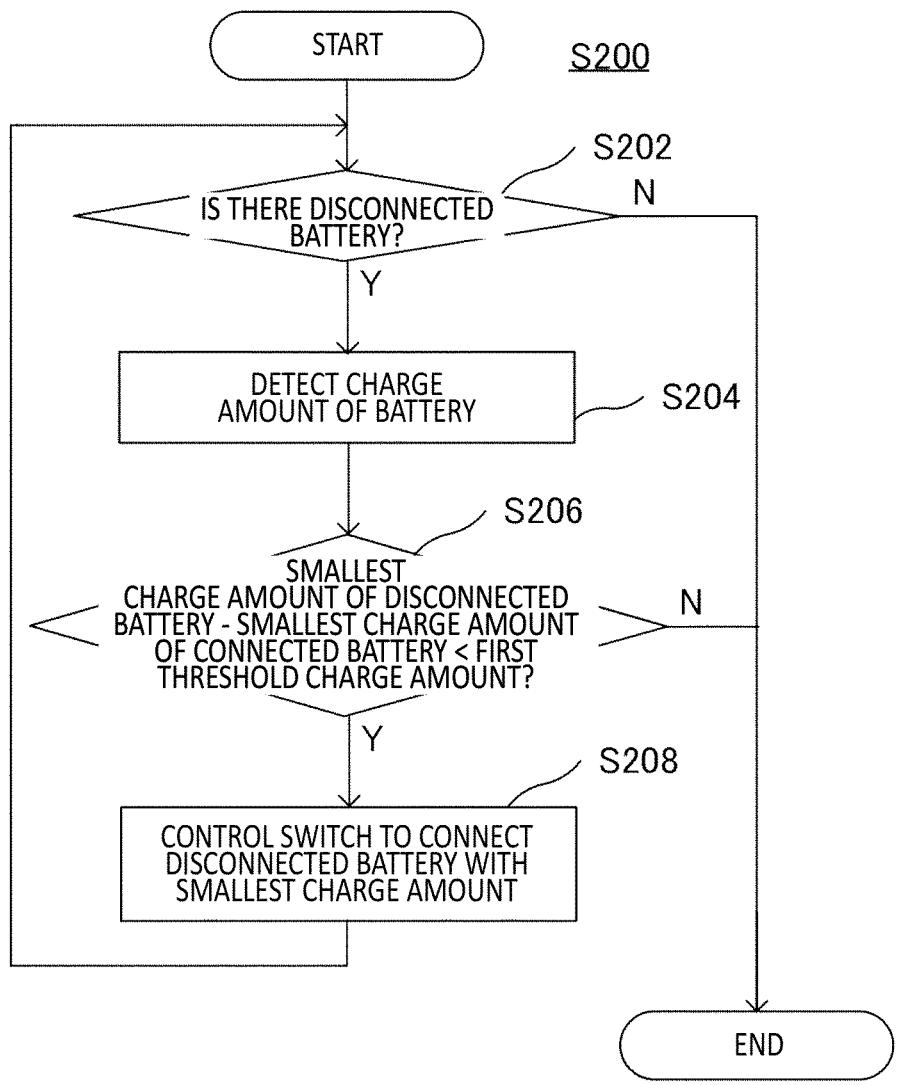
FIG. 7 illustrates a connection flow of the battery in the charge control method according to the present embodiment.

FIG. 7 illustrates a battery connection flow S200 in the charge control method of controlling the charging of the battery 32 according to the present embodiment. Note that the connection flow S200 may be performed following the disconnection flow S100, or the connection flow S200 and the disconnection flow S100 may be performed alternately, or performed independently, that is, in parallel.

In step S202, the control section 91 detects the group components G1 to G4 which are disconnected from the PCU 41, that is, the disconnected batteries 32. Whether the battery 32 is disconnected from the PCU 41 can be determined by detecting whether each of the four switches 36 are turned off. When even the single disconnected battery 32 exists, the flow proceeds to step S204, and when the disconnected batteries 32 do not exist, the flow is ended.

In step S204, the control section 91 detects a state of charge of each of the four batteries 32. The state of charge of each of the four batteries 32 is detected by each of the four ECUs 33, and a result of the detection is transmitted to the control section 91. The control section 91 extracts, based on the detection results received from the four ECUs 33, the battery 32 with a least charge amount among the batteries 32 which are connected to the PCU 41 and the battery 32 with a least charge amount among the batteries 32 which are disconnected from the PCU 41.

For example, in the example of the states of charge and the connection states of the four batteries 32 illustrated in FIG. 8, the battery 32 (the state of charge at 50%) of the group component G4 is extracted as the battery 32 with the least charge amount among the batteries 32 which are connected to the PCU 41, and the battery 32 (the state of charge at 60%) of the group component G2 is extracted as the battery 32 with the least charge amount among the batteries 32 which are disconnected from the PCU 41. Note that in the present example, the state of charge (that is, the charge amount) of the battery 32 is represented by a percentage to the largest charge amount, and also for simplicity, all the capacities of the four batteries 32 (that is, the largest charge amounts) are assumed to be the same.

In step S206, the control section 91 determines whether a difference between the charge amount of each of the two batteries 32 extracted in step S204, that is, a difference between the smallest charge amount of the battery 32 disconnect from the PCU 41 and the smallest charge amount of the battery 32 connected to the PCU 41, is smaller than the first threshold charge amount. That is, it is determined whether those charge amounts match with each other within a range of the first threshold charge amount. When the difference is smaller than the first threshold charge amount, charging of the connected battery 32 progresses, and on the other hand, discharging of the disconnected battery 32 progresses, so that a dominant charge amount difference between the batteries 32 no longer exists, and the flow proceeds to step S208. When the difference is the first threshold charge amount or more, a dominant charge amount difference exists between the batteries 32, and the flow is ended.

In the example illustrated in FIG. 8, since the difference (10%) between the smallest charge amount at 60% (the state of charge of the battery 32 of the group component G2) among the batteries 32 disconnected from the PCU 41 and the smallest charge amount at 50% (the state of charge of the battery 32 of the group component G4) among the batteries 32 connected to the PCU 41 is smaller than the first threshold charge amount (30%), the flow proceeds to step S208.

Note that the value of the first threshold charge amount is equal to the value of the first threshold charge amount in the disconnection flow S100 described above, but the first threshold charge amounts may be set as different values in the disconnection flow S100 and the connection flow S200.

In step S208, the control section 91 controls the switch 36 to connect, to the PCU 41, the battery 32 with the smallest charge amount among the batteries 32 which are disconnected from the PCU 41.

In the present example, the battery 32 of the group component G2 is connected to the PCU 41 to be charged by the power feed from the generator together with the batteries 32 of the group components G3 and G4. Once step S208 is completed, the flow returns to step S202.

The control section 91 repeats steps S202 to S208 until the determination in step S202 becomes negative when the battery 32 disconnected from the PCU 41 becomes zero or until the determination in step S206 becomes negative when the difference between the smallest charge amount of the battery 32 disconnected from the PCU 41 and the smallest charge amount of the battery 32 connected to the PCU 41 becomes larger than the first threshold charge amount.

In the present example, the determination in step S202 is positive since the battery 32 of the group component G1 is disconnected from the PCU 41, and the flow proceeds step S204, and the determination in step S206 is also positive since the difference (20%) between the smallest charge amount of the battery 32 (70% of the state of charge of the battery 32 of the group component G1) disconnected from the PCU 41 and the smallest charge amount of the battery 32 (50% of the state of charge of the battery of the group component G4) connected to the PCU 41 is smaller than the first threshold charge amount (30%), and the flow proceeds to step S208.

In step S208, the battery 32 of the group component G1 is connected to the PCU 41 to be charged by the power feed from the generator together with the batteries 32 of the group components G2 to G4. Since the number of the batteries 32 disconnected from the PCU 41 becomes zero, the determination in the next step S202 is negative, and the connection flow S200 is ended.

The charge control system 70 according to the present embodiment includes the engine 44 and the motor generator 42 (generator) configured to supply the generated power to two motors 21 of the VTOL rotor 20 and the cruising rotor 29, the plurality of batteries 32 including the two batteries 32 configured to store the electrical power generated by the generator and supply the stored electrical power to each of the two motors 21, the switch 36 configured to connect or disconnect each of the plurality of batteries 32 to or from the generator, and the control section 91 configured to control the switch 36 based on the state of charge of each of the plurality of batteries 32 to disconnect one battery 32 with the larger charge amount out of the two batteries 32 from the generator and connect the other battery with the smaller charge amount out of the two batteries to the generator to be charged. The switch 36 is controlled by the control section 91 based on the state of charge of each of the two batteries 32 to disconnect one battery 32 with the larger charge amount from the generator and connect the other battery 32 with the smaller charge amount to the generator to be charged, so that the generator can be operated according to the charge amount of the other battery 32 to charge the battery 32 without the application of the overload.

Furthermore, the control section 91 adjusts the power generation amount by the generator according to the states of charge of the remaining batteries 32 except for the one battery 32 among the plurality of batteries 32. Thus, the amount of current flowing into the other battery 32 decreases by decreasing the voltage in particular, and the battery 32 can be charged without being applied with the overload.

The charge control method according to the present embodiment includes storing the electrical power generated by the generator and also detecting the state of charge of each of the plurality of batteries including the two batteries configured to respectively supply the stored electrical power to the two motors 21 of the VTOL rotor 20 and the cruising rotor 29, controlling the switch 36 configured to connect or disconnect each of the plurality of batteries 32 based on the state of charge of each of the plurality of batteries 32 to or from the generator to disconnect one battery 32 with the larger charge amount out of the two batteries 32 from the generator, and controlling the switch 36 to connect the other battery 32 with the smaller charge amount out of the two batteries 32 to the generator to be charged. The switch 36 is controlled based on the state of charge of each of the two batteries 32 to disconnect one battery 32 with the larger charge amount from the generator and connect the other battery 32 with the smaller charge amount to the generator to be charged, so that the generator can be operated according to the charge amount of the other battery 32 to charge the battery 32 without being applied with the overload.

The aircraft 100 according to the present embodiment includes the charge control system 70, and by performing the charge control method by the charge control system, so that the plurality of batteries 32 can be charged without being applied with the overload.

Note that in the aircraft 100 according to the present embodiment, a set of the engine 44, the motor generator 42, and the PCU 41 is included, but a plurality of sets of the engines 44, the motor generators 42, and the PCUs 41, that is, a plurality of generators, may be included. In such a case, the charge control system 70 according to the present embodiment is to be constituted for each of the group components connected to the respective generators.

While the present invention have been described with the embodiments above, the technical scope of the present invention is not limited to the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

What is claimed is:

1. A charge control system for controlling charging of a plurality of batteries, the charge control system comprising:
   a generator configured to supply generated power to first and second loads;
   a plurality of batteries connected to the generator in parallel and configured to store electrical power generated by the generator, the plurality of batteries including first and second batteries respectively connected to the first and second loads and configured to respectively supply the electrical power stored therein to the first and second loads;
   a plurality of switches, each of which being provided between the generator and one corresponding battery among the plurality of batteries and configured to connect or disconnect the one corresponding battery to or from the generator; and
   a control section configured to control the plurality of switches based on a state of charge of each of the plurality of batteries to
   disconnect one battery with a larger charge amount out of the first and second batteries from the generator to supply the electrical power stored in the one battery to one load connected to the one battery out of the first and second loads, and
   connect an other battery with a smaller charge amount out of the first and second batteries to the generator to charge the other battery by the electrical power generated by the generator and to supply the generated power from the generator to an other load connected to the other battery out of the first and second loads.

2. The charge control system according to claim 1, wherein
   the control section is configured to adjust a power generation amount by the generator according to states of charge of remaining batteries except for the one battery among the plurality of batteries.

3. The charge control system according to claim 2, wherein
when a charge amount of the other battery matches with a charge amount of the one battery within a first threshold charge amount, the control section is configured to control a switch provided between the generator and the one battery among the plurality of switches to connect the one battery to the generator.

4. The charge control system according to claim 3, wherein
when a difference between a charge amount of each of the first and second batteries is larger than a first threshold charge amount, the control section is configured to disconnect the one battery from the generator.

5. The charge control system according to claim 2, wherein
when a difference between a charge amount of each of the first and second batteries is larger than a first threshold charge amount, the control section is configured to disconnect the one battery from the generator.

6. An aircraft comprising:
the charge control system according to claim 2, wherein the first and second loads are propulsion systems configured to generate thrust to fly.

7. The charge control system according to claim 1, wherein
when a charge amount of the other battery matches with a charge amount of the one battery within a first threshold charge amount, the control section is configured to control a switch provided between the generator and the one battery among the plurality of switches to connect the one battery to the generator.

8. The charge control system according to claim 7, wherein
when a difference between a charge amount of each of the first and second batteries is larger than a first threshold charge amount, the control section is configured to disconnect the one battery from the generator.

9. An aircraft comprising:
the charge control system according to claim 7, wherein the first and second loads are propulsion systems configured to generate thrust to fly.

10. The charge control system according to claim 1, wherein
when a difference between a charge amount of each of the first and second batteries is larger than a first threshold charge amount, the control section is configured to disconnect the one battery from the generator.

11. The charge control system according to claim 10, wherein
when the charge amount of each of the first and second batteries is larger than a second threshold charge amount, the control section is configured to disconnect the one battery from the generator.

12. The charge control system according to claim 11, wherein
the first and second batteries are respectively batteries with a most charge amount and a least charge amount among the plurality of batteries.

13. The charge control system according to claim 12, wherein
when a difference between a charge amount of a third battery with a most charge amount among remaining batteries except for the one battery among the plurality of batteries and a charge amount of the other battery is larger than the first threshold charge amount, the control section is configured to disconnect the third battery from the generator.

14. The charge control system according to claim 13, wherein
the control section is configured to adjust a power generation amount by the generator according to states of charge of the remaining batteries which are connected to the generator among the plurality of batteries.

15. The charge control system according to claim 10, wherein
the first and second batteries are respectively batteries with a most charge amount and a least charge amount among the plurality of batteries.

16. The charge control system according to claim 15, wherein
when a difference between a charge amount of a third battery with a most charge amount among remaining batteries except for the one battery among the plurality of batteries and a charge amount of the other battery is larger than the first threshold charge amount, the control section is configured to disconnect the third battery from the generator.

17. The charge control system according to claim 16, wherein
the control section is configured to adjust a power generation amount by the generator according to states of charge of the remaining batteries which are connected to the generator among the plurality of batteries.

18. An aircraft comprising:
the charge control system according to claim 1, wherein the first and second loads are propulsion systems configured to generate thrust to fly.

19. The aircraft according to claim 18, further comprising:
an attitude detection unit configured to detect an attitude of an aircraft body arranged to store the first and second loads, wherein
when it is determined that the attitude of the aircraft body is stable based on a detection result of the attitude detection unit, the control section is configured to control a switch provided between the generator and the one battery among the plurality of switches to disconnect the one battery from the generator.

20. A charge control method of controlling charging of a plurality of batteries, the charge control method comprising:
detecting a state of charge of each of a plurality of batteries connected to a generator in parallel and configured to store electrical power generated by the generator, the plurality of batteries including first and second batteries respectively connected to first and second loads and configured to respectively supply the electrical power stored therein to the first and second loads;
controlling a plurality of switches, each of which being provided between the generator and one corresponding battery among the plurality of batteries and configured to connect or disconnect the one corresponding battery to or from the generator based on the state of charge of each of the plurality of batteries, wherein
the controlling the plurality of switches includes
controlling a switch, that is provided between the generator and one battery with a larger charge amount out of the first and second batteries, to disconnect the one battery from the generator to supply the electrical power stored in the one battery to one load connected to the one battery out of the first and second loads; and controlling a switch, provided between the generator and an other battery with a smaller charge amount out of the first and second batteries, to connect the other battery to the generator to charge the other battery by the electrical power generated by the generator and to supply generated power from the generator to an other load connected to the other battery out of the first and second loads.

\* \* \* \* \*